United States Patent Office 2,886,446
Patented May 12, 1959

2,886,446

PROCESS FOR MAKING CHEWING GUM AND PRODUCT

Franklin Kramer, Lexington, Harold Rosenthal, Newtonville, and Arthur F. Tole, Melrose, Mass., assignors to General Foods Corporation, White Plains, N.Y., a corporation of Delaware No Drawing. Application December 8, 1958
Serial No. 778,601

13 Claims. (Cl. 99—135)

This invention relates to a process for preparing improved chewing gum which is characterized by a flavor which is controllably released over an extended period of time at a high level.

Chewing gum may comprise a substantially water insoluble, chewable, plastic gum base such as chicle, or substitutes therefor, including jelutong, guttakay, rubber, or certain comestible natural or synthetic resins or waxes. Incorporated with the gum base, and in intimate admixture therewith, may be plasticizers or softening agents, e.g. glycerine; flavoring agents e.g. oil of wintergreen, oil of spearmint, oil of peppermint, licorice, fruit flavors, spice oils, etc.; or sweetening agents which may be sugars including sucrose or dextrose and/or artificial sweeteners such as cyclamates or saccharine. Other optional ingredients may also be present.

It is found that when most flavored chewing gums, such as slab gums, are chewed the initial perception of flavor appears after a minute or more at a low level of intensity, and after three or four minutes of chewing the flavor intensity drops to an uninteresting level. It is also found upon analysis, that gum chewed for as long as thirty minutes may retain as much as 60% of the flavor initially present, and that this proportion of the flavoring agent is thus not effectively used.

It is an object of this invention to provide a chewing gum containing a flavoring composition characterized by an early flavor perception at an interesting level and an extended period of controlled flavor release. A second object of this invention is to provide a chewing gum containing a flavoring composition which is similar in flavor character to that of the original flavoring oil. A third object of this invention is to increase the total amount of flavor released during the chewing period of gums containing the herein described flavoring composition. A fourth object of this invention is to decrease the amount of flavor oil required in chewing gum to obtain the desired flavor intensity. Other objects of this invention will be apparent to those skilled-in-the-art from the following detailed description of the invention.

In accordance with certain aspects of this invention, chewing gum containing a flavoring composition characterized by an extended flavor perception time, true flavor character, controlled release of a large portion of flavoring agent, and reduction in amount of flavor oil required may be prepared by the process comprising forming a gelatin-encapsulated flavor, and substantially uniformly distributing said gelatin-encapsulated flavor within an all-enveloping mass of a chewable gum base. The term "encapsulate," as used herein, means to add the flavoring oil to the gelatin solution, to uniformly distribute the flavor therein, and then to dry the gelatin to form a product-gelatin containing uniformly distributed flavoring oil. The product chewing gum thus comprises a water-immiscible flavoring agent encapsulated or dispersed within preferably finely divided particles of gelatin and an all-enveloping mass of a chewing gum base within which the particles are substantially distributed.

The gelatin which may be employed in this invention may be any of the grades and types of gelatin, including these obtained from e.g. tanner's stock, ossein, pigskin, etc. Modified gelatins including e.g. gelatin metaphosphates, hardened gelatin (including e.g. those which have been treated with e.g. formaldehyde etc.), heat-treated gelatins, and others may be employed. The Bloom of the gelatin which is employed may vary widely. When a rapid release is desired, it is preferred to use a gelatin having a Bloom less than 50. For example, it may be possible to use a gelatin having zero Bloom or zero gel strength. When slower flavor release is desired the Bloom preferably will be above 200. For intermediate degrees of flavor release, it is preferred to use Blooms between those values. Although the pH of the gelatin solution employed may fall within the range of 2 to 10, it is preferred that it be maintained in the acid region, e.g. 2 to 7.

In carrying out the process of this invention according to one embodiment, a volatile, water-immiscible flavoring oil may be encapsulated or dispersed within a body of gelatin. Encapsulation may be effected by any of various techniques which permit attainment of a solid body of gelatin containing dispersed therewith particles of the volatile water-immiscible flavor. Typically it will be carried out by emulsifying and dispersing the volatile-water-immiscible flavoring oil in the form of discrete or minute micro-droplets throughout an aqueous solution of gelatin, and drying the emulsion so formed.

Encapsulation may be effected by various drying techniques including e.g. tunnel or slab drying, spray drying, foam drying, drum drying, freeze drying, pan drying, tray drying, oven drying, or other drying techniques well known to those skilled-in-the-art. Encapsulation may also be effected by other physical techniques including precipitation type techniques such as coacervation including, for example, so-called simple coacervation by means of various salts such as sodium sulfate which under controlled conditions permit attainment of the desired gelatin encapsulated flavor; or alternatively by use of the so-called complex coacervation technique according to which various colloidal materials precipitate the gelatin-flavor product. Other techniques for encapsulating the volatile, water-immiscible flavors in gelatin will be apparent to those skilled-in-the-art.

The product formed by these encapsulation techniques consists essentially of a continuous phase of gelatin containing therewithin discrete micro-droplets of the oil.

In carrying out the process of this invention when employing the tunnel or slab drying technique a gelatin solution may be formed containing 5 to 100, say 50 parts of gelatin per one hundred parts of water, the latter being preferably at temperature of 90° F. to 180° F., say 120° F., during dissolution of the gelatin. The solution is allowed to cool preferably to 33° F. to 75° F., say 60° F., and it is then formed into slabs which are tunnel dried or slab dried, the two terms being synonymous as used herein.

Prior to the solidification or drying of the gelatin solution, and preferably after cooling to 80° F. to 140° F., say 110° F., the desired volatile, water-immiscible flavoring agent may be added to the solution and homogenized to form an emulsion. The flavoring agents which may be employed include oil of peppermint, oil of spearmint, fruit essences, licorice, spice oils and the like. The selected flavoring agent may be added in amount of 10% to 100%, say 50% by weight of the gelatin.

When the emulsion of flavoring agent in gelatin solution is solidified as by tunnel drying, the resultant tunnel-dried emulsion has the flavoring agent encapsulated therewithin in the form of discrete micro-droplets. Preferably the solid dried emulsion will be reduced to powder form which may be 20 mesh to 400 mesh, say 100 mesh. The resultant material comprises a tunnel-dried emulsion of discrete micro-droplets of a volatile, water-immiscible flavoring agent dispersed within finely divided particles of gelatin. The flavoring agent is encapsulated or locked within the dry gelatin particles.

Formation of flavored chewing gum may be effected by mixing from 3% to 30%, say 15% by weight of flavoring composition with from 70% to 97%, say 85% by weight of gum base. Typically the gum base will be chicle, although it may be jelutong, guttakay, etc. Other ingredients including sweetening agents, coloring agents, etc. may be present in desired amount.

In carrying out the process of this invention wherein the gelatin encapsulated flavoring agent is dried by the process of foam drying, a gelatin solution may be formed containing 5 to 100 parts of gelatin per one hundred parts of water, the latter being preferably at temperature of 90° F. to 180° F. during the dissolution of the gelatin. The solution is allowed to cool preferably to 33° F. to 75° F., and it is then solidified by foam-drying.

Prior to the foam-drying of the gelatin solution and preferably prior to the foaming but after cooling to 80° F. to 140° F., the desired volatile, water-immiscible flavoring agent may be added to the solution and homogenized to form an emulsion. The flavoring agents which may be employed include oil of peppermint, oil of spearmint, fruit essences, licorice, spice oils, and the like. The selected flavoring agent may be added in an amount equal, to 10% to 100% of the weight of the gelatin. Homogenization of the gelatin solution and the oil may be done in any one of various types of apparatus. For example, a Manton-Gaulin homogenizer may be employed wherein the liquid is raised to a pressure which may be as high as e.g. 500–1200 p.s.i.g. and then discharged through a valve as the pressure is released.

Foaming of the gelatin solution is effected by mixing the same at temperature of e.g. 70° F.–150° F. with inert gas, such as nitrogen. Use of inert gas is particularly desirable as it reduces oxidation of the flavoring oils. Although the amount of gas added to the solution may vary, it will usually be added in a volume equal to one-half the volume of solution. The mixture of gas and solution is subjected to thorough mixing as by passage through a Votator which is a combination mixer and heat exchanger. It comprises a shaft rotating within a tube and occupying most of the area thereof, whereby the mixture passing through the tube is confined to a thin annular area. As the mixture passes through the tube, the heat of mixing may raise the temperature thereof. Desired outlet temperature of e.g. 70° F.–80° F. may be maintained by passing cooling medium through a jacket surrounding the mixing tube of the Votator. The foamed mixture may leave the Votator at back pressure of e.g. 155 p.s.i.g. and it is then foam-dried.

The foamed mixture from the Votator may be solidified or dried by pouring it into pre-chilled pans. Here it is dried in time which may be 30%–50% of the time required to dry by other procedures.

The solidified foam-dried flavoring composition resembles foam rubber in physical appearance; it has a large number of void spaces distributed within a latticework of flavoring composition. Density of this material may be e.g. 0.5–0.8, preferably about 0.625. Because of its physical state, it may be ground to e.g. 20–400 mesh particles in times which may be as little as 50% of that required to reduce e.g. slab-dried material to the same size. It is quite stable and may be stored as such for extended periods.

Formation of flavored chewing gum may be effected by mixing from 3% to 30%, by weight of foam-dried flavoring composition with from 70% to 97%, by weight of gum base. A preferred composition has 15% of foam-dried flavoring composition in 85% by weight of gum base. Typically the gum base will be chicle, although it may be jelutong, guttakay, etc. Other ingredients including sweetening agents, coloring agents, etc. may be present in desired amount.

In carrying out the process of this invention where the gelatin encapsulated flavoring agent is prepared by coacervation with salt, a gelatin solution may be formed containing typically 10 parts of gelatin per 100 parts of water, the latter being preferably at 90° F.–180° F. during dissolution of the gelatin. The solution is allowed to cool to preferably 80° F.–140° F., and the desired water-immiscible flavoring agent is added to the solution which is homogenized to form an emulsion wherein the drop size of the oil is in the low micron range, i.e. 2–5 microns. The flavoring agents which may be employed include oil of peppermint, oil of spearmint, fruit essences, licorice, spice oils, and the like. The selected flavoring agent may be added in an amount equal to 10–200% of the weight of the gelatin. Homogenization of the gelatin solution in the oil may be done in any one of various types of apparatus.

With the emulsion at a temperature of preferably about 120° F., coacervation may be induced by adding slowly and uniformly a solution of a salt such as sodium sulfate of concentration of e.g. 20%. Subsequently treatment may include filtering and water washing at temperature below the melting point of the gelatin.

In carrying out the process of this invention when various modified gelatins are to be employed as the flavor encapsulating agent, they may each be prepared according to various techtniques. For example, phosphate modified gelatin (i.e. a gelatin metaphosphate) may be prepared by reacting the gelatin with various metaphosphates; hardened gelatins may be prepared by treating gelatin solutions with hardening agents including e.g. formaldehyde, etc. to produce hardened gelatins. Other types of gelatin which may be employed in connection with this invention when serving as the encapsulating agent for flavors will be apparent to those skilled-in-the-art.

Although the chewing gums of this invention may be prepared containing a single flavoring agent, it is possible to extend the range of properties of the gum by use of combinations of two or more flavoring compositions. For example, it is possible to separately prepare dry flavoring compositions from gelatins of various Blooms, and then to add these compositions to a gum. Such a chewing gum may for example contain a mixture of flavoring compositions prepared from a low Bloom gelatin (characterized by a more rapid flavor release) and a high Bloom gelatin (characterized by a slower flavor release). The properties of the chewing gum product will be intermediate to the properties obtained from each of the flavoring compositions when used separately. Specifically if a flavoring composition formed from 50 Bloom gelatin is mixed with a flavoring composition from 200 Bloom gelatin, and the mixture is added to a chewing gum, the product may have a flavor release which is substantially more even over the chewing period than is the case when a single flavoring composition is employed.

Similarly it is possible to modify the properties of the product gum by use of mixtures of flavoring compositions characterized by different ratios of gelatin to oil. If a composition containing 10% flavoring agent by weight of gelatin is mixed with one containing 100% flavoring agent by weight of gelatin (i.e. equal parts of gelatin and flavoring agent), the resulting blend of flavoring composition will yield a chewing gum having a more even liberation of flavor than is obtained by use of either flavoring agent alone.

Controlled liberation of flavor of the product chewing gum, may also be obtained by using mixtures of flavoring compositions (a) of different particle size, the resulting gum deriving much of its initial flavor from the smaller particles and much of its later flavor from the larger particles; or (b) formed from gelatins of different pH, the composition formed from gelatin of higher pH (e.g.

9) giving quicker release of flavor, while that formed from lower pH (e.g. 2.5) giving slower release.

It is also possible to obtain chewing gum products having extended flavor liberation time by use of the herein described fixed flavors in combination with unfixed flavors. A particularly desirable product contains 80% unfixed flavor and 20% fixed or encapsulated flavor. Preferably the majority of the flavor will be in unfixed form.

The resulting chewing gum may include an all-enveloping mass of gum base such as chicle, within which is substantially uniformly distributed particles of gelatin-encapsulated flavoring agent. Although the mixing procedure followed may result in transfer of some of the flavoring agent from the gelatin-encapsulation to the gum, substantially all of the flavoring agent which was admitted will still be found in the gelatin-encapsulation after mixing.

It is characteristic of this chewing gum product that it retains its flavor under conditions of vigorous chewing for extended periods which may be double that of compositions heretofore known to those skilled-in-the-art. For example, the flavor perception time may be six minutes or longer, in contrast to the usual three minutes which is the flavor perception time of comparable products heretofore known.

The chewing gum so formed is also characterized by high degree of flavor release. The products herein described may retain as little as 25%–35% of the flavor originally present after mastication for 30 minutes. Gums heretofore available, when chewed for the same time, are found to retain as much as 60% of the flavor originally present which is being released at such a slow rate that the intensity of the flavor is at an uninteresting level.

The greater availability of flavor by use of the flavoring compositions herein described also permits attainment of high flavor level in the chewing gum products with use of lower amounts of the flavoring oils.

The mixed blend of gum base and flavor which has been mixed with other ingredients, preferably in a Baker-Perkins mixer, will typically be formed into loaves by pouring into pans. These loaves, at temperature of about 100° F., may be extruded through a small rectangular opening to form a strip which, after it has been reduced in thickness, may be cut into desired lengths.

Chewing gums prepared with the flavor composition in accordance with this invention have a flavor character more nearly that of the original flavor oil than chewing gum prepared by the direct incorporation of the flavoring oil into the chewing gum.

The following specific example will serve to illustrate a preferred embodiment of this invention:

Example I

According to a specific example of this invention, 40 parts by weight of 50 Bloom gelatin was added to 60 parts by weight of water at temperature of 150° F. The mixture was agitated until the gelatin completely dissolved and then the solution was cooled to 120° F. Twenty parts by weight of methyl salicylate (oil of wintergreen) were added to the solution and homogenized to form an emulsion. The emulsion was poured into pans and chilled for 1 hour to 60° F. The resultant 0.375 inch thick slabs were air dried with circulating air at room temperature (75° F.) i.e. tunnel dried. The solid gelatin was ground to 24–35 mesh particle size.

100 parts by weight of chicle were mixed with 18 parts by weight of the above-prepared slab-dried gelatin-encapsulated flavor. 300 parts of sucrose and 100 parts corn syrup were added. Mixing was effected in a ribbon blender with jacketed side walls of the type manufactured by the Baker Perkins Co.

A taste test was made to compare a slab-dried chewing gum product of this invention with a standard chewing gum containing the same total amount of flavor in unfixed form. During the tests, 0.5 inch x 0.05 inch x 0.0625 inch slabs of each gum were separately chewed and the following were noted: time and intensity of initial flavor, extent of flavor burst, duration of interesting flavor level, and approximate total time during which flavor was available. In these tests, the rating of flavor intensity was measured by the person chewing, on a scale ranging from 0 to 10, the level of 1 indicating threshold flavor intensity just discernible to the taste, and a level of 10 indicating a maximum intensity above which the sensation originating in the flavor is unpleasant.

The commercially available standard containing unfixed flavor in chicle was characterized by initial indication of flavor at a level of 1 after about 7–8 seconds. Intensity rose to 3 at about 15 seconds, and thereafter at a slower rate to a level of 6 at about 60 seconds. At this point, flavor intensity dropped off to 3 after about 90 seconds. At about 2 minutes, the flavor intensity was at the uninteresting low level of 1.5. After 4 minutes of chewing, the flavor had dropped below the threshold value of 1, and the standard gum was flat and lifeless.

Initial flavor liberation in a sample prepared according to this invention and containing slab-dried flavoring composition occurred at level of 2 after 5 seconds. Intensity continuously rose at gradual rate to a level of 10 after about 2 minutes. Thereafter it dropped only slightly and at 4 minutes, it was still at a level of about 9. After 5 minutes, the intensity had dropped to 6. Flavor was very apparent for total time of about 10 minutes at which point the intensity had dropped to the threshold value of 1. During the entire period of the test, the flavor was rich and full-bodied and substantially true in character.

For ease of comparison, the results of a taste test are presented in tabular form:

*Flavor intensity level*

| Chewing Time | Standard | Typical New Product |
|---|---|---|
| 5 Seconds | 1 | 2 |
| 7 Seconds | 1 | 3 |
| 10 Seconds | 2 | 5 |
| 15 Seconds | 3 | 6 |
| 20 Seconds | 4 | 7 |
| 30 Seconds | 5 | 9 |
| 60 Seconds | 6 | 9.5 |
| 90 Seconds | 3 | 9.5 |
| 2 Minutes | 1.5 | 10 |
| 3 Minutes | 1 | 9.5 |
| 4 Minutes | 1 | 9 |
| 5 Minutes |  | 8.5 |
| 6 Minutes |  | 6 |
| 7 Minutes |  | 5 |
| 8 Minutes |  | 4 |
| 9 Minutes |  | 3 |
| 10 Minutes |  | 1 |

It is apparent to the person making the chewing test that the slab-dried sample prepared in accordance with this invention is superior to the sample containing the same amount of flavoring oil in unfixed form. Specifically the product of this invention is characterized by extended flavor perception time, early flavor release, a true flavor character which is substantially that of the flavoring agent, and a high degree of flavor released.

An additional specific embodiment which is illustrative of the instant broad invention is:

Example II

According to this embodiment of this invention, a 41% gelatin solution was prepared by adding to 16.25 pounds of water at room temperature, 11.25 pounds of 40 Bloom neutral gelatin having viscosity of 19 mp. and pH of 6.7. The gelatin was allowed to soak and solution was then effected by heating to 140° F. 3.75 pounds of oil of peppermint was added with continuous mechanical stirring and the mixture was homogenized in a Manton-Gaulin homogenizer, for 35 minutes at 1200 p.s.i.g.

Nitrogen gas in amount corresponding to 50% by volume of the solution was admitted and the mixture passed through a Votator under a back pressure of 155 p.s.i.g. Outlet temperature from the Votator was 80° F. The foamed mixture was collected in pre-chilled pans and solidified by cooling at 50° F. to form a product having density of 0.625. The resulting product was dried and ground to fineness of 20 mesh—400 mesh.

18 parts by weight of this flavoring composition were blended with 100 parts by weight of chicle. Mixing was effected in a ribbon blender with jacketed side walls.

*Example III*

According to this embodiment of this invention a 28.5% gelatin solution was prepared containing 9.5% oil of peppermint. The gelatin used had Bloom of 40, a viscosity of 19 mp. and a pH of 6.7. The solution at temperature of 120° F. was spray-dried by passage through a whirl jet type nozzle under pressure differential of about 1000 p.s.i.g. The spray pattern leaving the nozzle is passed into and through a cold air zone immediately around the nozzle outlet, formed by a blast of cold air at e.g. 70° F. directed coaxially with the direction of atomization. As the sprayed gelatin passes through this cold air zone, it hardens in the form of droplets which are then passed through a warm drying zone. Hot air to the top of the drying zone was at temperature of 500° F. and air outlet temperature at the bottom of the drying zone was 265° F.

The 40–80 micron spray-dried product recovered at the bottom of the tower contained 26.5% oil, 69.9% gelatin, and 3.6% water. 18 parts by weight of this flavoring composition were mixed with 100 parts by weight of chicle. 300 parts of sucrose and 100 parts corn syrup were added. Mixing was effected in a ribbon blender with jacketed side walls of the type manufactured by the Baker Perkins Co.

Although we have herein described specific examples showing certain details of our invention, it will be apparent to those skilled-in-the-art that various modifications and changes may be made which come within the scope of this invention. This application is a continuation-in-part of application Serial Number 595,610, of the same inventors, filed July 3, 1956, entitled Product and Process.

We claim:

1. A chewing gum comprising a water-immiscible flavoring agent encapsulated in finely-divided particles of gelatin, and an all-enveloping mass of a chewable gum base within which the particles are substantially uniformly distributed.

2. A chewing gum as claimed in claim 1 wherein said chewable gum base within which the particles of gelatin are substantially uniformly distributed contains free unfixed flavoring agent.

3. A chewing gum as claimed in claim 2 containing 80% free, unfixed flavor and 20% fixed flavor.

4. A chewing gum comprising 3% to 30% of discrete micro-droplets of a volatile water-immiscible flavoring agent encapsulated in finely-divided particles of gelatin, and 70% to 97% of an all-enveloping mass of a chewable gum base within which said particles are substantially uniformly distributed.

5. A chewing gum comprising 3% to 30% of discrete micro-droplets of a volatile water-immiscible flavoring agent encapsulated in finely-divided particles of gelatin, free unfixed flavoring agent in amount greater than said encapsulated flavoring agent, and 70% to 97% of an all-enveloping mass of a chewable gum base within which said particles are substantially uniformly distributed.

6. A chewing gum comprising 20–400 mesh particles of a dried emulsion of discrete micro-droplets of a volatile, water-immiscible flavoring agent dispersed in gelatin, and an all-enveloping mass of a chewable gum base within which the particles are substantially uniformly distributed.

7. A chewing gum comprising smaller particles of gelatin characterized by faster liberation of flavor and larger particles of gelatin characterized by slower liberation of flavor each containing dispersed therewithin in dried emulsion form discrete micro-droplets of a volatile water-immiscible flavoring agent, and an all-enveloping mass of a chewable gum base within which the particles are substantially uniformly distributed whereby the flavor is released substantially evenly and uniformly over the extended chewing time.

8. A chewing gum comprising particles of low pH gelatin characterized by slow flavor release and particles of high pH gelatin characterized by rapid flavor release, each containing encapsulated therewithin a flavoring agent, and an all-enveloping mass of a chewable gum base within which the particles are substantially uniformly distributed.

9. A chewing gum as claimed in claim 8 wherein the pH of the low pH gelatin is in the lower portion of the pH range 2–10 and the pH of the high pH gelatin is in the upper portion of the pH range 2–10.

10. A chewing gum comprising particles of low Bloom gelatin characterized by rapid flavor release, and particles of high Bloom gelatin characterized by slow flavor release, each containing encapsulated therewithin a flavoring agent, and an all-enveloping mass of a chewable gum base within which the particles are substantially uniformly distributed.

11. A chewing gum as claimed in claim 10 wherein the low Bloom gelatin has a Bloom less than about 50 and the high Bloom gelatin has a Bloom greater than about 200.

12. The method of preparing a chewing gum comprising encapsulating flavoring agent within finely divided particles of gelatin, and substantially uniformly distributing said gelatin-encapsulated flavoring agent within an all-enveloping mass of a chewable gum base.

13. The method of preparing a chewing gum comprising forming a solid dried emulsion of a volatile, water-immiscible flavoring agent encapsulated within finely divided particles of gelatin, and substantially uniformly distributing said gelatin-encapsulated flavoring agent within an all-enveloping mass of a chewable gum base.

References Cited in the file of this patent

UNITED STATES PATENTS

| | | |
|---|---|---|
| 1,526,039 | Arkell et al. | Feb. 10, 1925 |
| 1,993,289 | Stokes et al. | Mar. 5, 1935 |
| 2,157,839 | Wertheimer | May 9, 1939 |
| 2,258,567 | Epstein et al. | Oct. 7, 1941 |
| 2,369,847 | Olsen et al. | Feb. 20, 1945 |